United States Patent
Douriet et al.

(10) Patent No.: US 7,607,028 B2
(45) Date of Patent: Oct. 20, 2009

(54) MITIGATE POWER SUPPLY NOISE RESPONSE BY THROTTLING EXECUTION UNITS BASED UPON VOLTAGE SENSING

(75) Inventors: Daniel Douriet, Austin, TX (US); Anand Haridass, Austin, TX (US); Andreas Huber, Austin, TX (US); Colm B. O'Reilly, Austin, TX (US); Bao G. Truong, Austin, TX (US); Roger D. Weekly, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 570 days.

(21) Appl. No.: 11/420,820

(22) Filed: May 30, 2006

(65) Prior Publication Data

US 2007/0283172 A1 Dec. 6, 2007

(51) Int. Cl.
*G06F 1/26* (2006.01)
(52) U.S. Cl. ........ 713/300; 713/320
(58) Field of Classification Search ........ 713/300, 713/320, 323
See application file for complete search history.

(56) References Cited

U.S. PATENT DOCUMENTS

| | | | |
|---|---|---|---|
| 5,894,423 A | 4/1999 | Ling et al. | |
| 6,191,647 B1 * | 2/2001 | Tanaka et al. | 327/551 |
| 6,219,723 B1 * | 4/2001 | Hetherington et al. | 710/18 |
| 6,472,856 B2 | 10/2002 | Groom et al. | |
| 6,636,976 B1 * | 10/2003 | Grochowski et al. | 713/320 |
| 6,675,301 B1 * | 1/2004 | Kurosawa | 713/300 |
| 6,721,903 B2 * | 4/2004 | Yoshioka et al. | 714/10 |
| 6,799,070 B2 | 9/2004 | Wolfe et al. | |
| 6,819,538 B2 | 11/2004 | Blaauw et al. | |
| 6,922,111 B2 | 7/2005 | Kurd et al. | |
| 6,934,865 B2 * | 8/2005 | Moritz et al. | 713/324 |
| 7,035,785 B2 * | 4/2006 | Grochowski et al. | 703/18 |
| 7,071,723 B2 | 7/2006 | Krishnamoorthy et al. | |
| 7,134,036 B1 * | 11/2006 | Guan | 713/500 |
| 7,233,163 B2 | 6/2007 | Krishnamoorthy et al. | |
| 7,236,920 B2 * | 6/2007 | Grochowski et al. | 703/18 |
| 7,339,411 B2 * | 3/2008 | Yuuki et al. | 327/198 |
| 7,467,050 B2 * | 12/2008 | Douriet et al. | 702/64 |
| 7,480,810 B2 * | 1/2009 | Gonzalez et al. | 713/300 |
| 7,483,248 B1 * | 1/2009 | Ho et al. | 361/87 |
| 2004/0085085 A1 | 5/2004 | Muhtaroglu et al. | |
| 2005/0062507 A1 | 3/2005 | Naffziger et al. | |
| 2006/0132086 A1 | 6/2006 | Altenburg et al. | |
| 2007/0006012 A1 * | 1/2007 | Mosur et al. | 713/600 |
| 2008/0007272 A1 | 1/2008 | Ferraiolo et al. | |
| 2008/0082887 A1 | 4/2008 | Dhong et al. | |
| 2009/0063065 A1 | 3/2009 | Weekly | |
| 2009/0063884 A1 | 3/2009 | Weekly | |

* cited by examiner

*Primary Examiner*—Chun Cao
(74) *Attorney, Agent, or Firm*—Yee & Associates, P.C.; Diana R. Gerhardt

(57) ABSTRACT

A system for mitigating power supply and power distribution system noise response by throttling execution units based upon voltage sensing in a circuit is provided. A sensing unit senses the voltage of a circuit. The sensing unit determines if the execution of another execution unit will cause the circuit voltage to drop below a threshold level. In response to a determination that the execution of another execution unit will cause the circuit voltage to drop below the threshold level, the execution unit is throttled.

20 Claims, 5 Drawing Sheets

MITIGATE POWER SUPPLY NOISE RESPONSE BY THROTTLING EXECUTION UNITS BASED UPON VOLTAGE SENSING

BACKGROUND OF THE INVENTION

1. Field of the Invention

The present invention relates generally to an apparatus and method for controlling power supply and power distribution system noise. More specifically, the present invention provides a method and apparatus for mitigating power supply and power distribution system noise response by throttling execution units based upon voltage sensing.

2. Description of the Related Art

Power supply and power distribution system noise, especially dips due to large step activity increases in a microprocessor are a limiting factor in how fast the circuits in such a processor can operate. This limits either the system operating frequency or limits chips that can yield at any given objective frequency. Traditionally, decoupling capacitors have been used to limit the magnitude of this noise. However, as design frequencies have risen over the years, decoupling capacitance is becoming either less effective at the frequencies that are required to have an effect, or are too costly in financial terms or power dissipation terms. That is, in terms of chip real estate and oxide leakage impact on chip power requirements.

Electrical distance from capacitor placement sites to circuits on chips constrained by physical space availability can make discrete capacitors completely or nearly ineffective. Prior art has discussed throttling of code execution scheduling when transitions from low to high activity are requested. However, the performance impact of stalling executions during every transition from a low activity state to a high activity state has a significant cost impact on performance. FIG. 1 is a chart depicting an example plot, designated as 102, of the voltage droop that can occur with a transition of execution demand of nearly 0% capacity to 90% of capacity. Droop is the difference between the set point and the actual operating or control point. The left axis represents the voltage, from −0.1 to 0.04, where 0=Vdc at the minimum load. Vdc is the DC voltage. Therefore, the statement 0=Vdc at the minimum load means that background DC voltage at the minimum load has been removed from the chart and all that is left is the noise. The right axis represents the number of stalled executions, from 0 to 200. The horizontal axis represents the number of nanoseconds (ns) that have passed, ranging from 0 to 800 ns.

The 90 mv (millivolt) plus droop from the no load voltage, shown in 102, determines the limits of the maximum operating capability of the processor even though it occurs only sporadically.

SUMMARY OF THE INVENTION

Exemplary embodiments describe a system, a circuit and a method for mitigating power supply and power distribution system noise response by throttling execution units based upon voltage sensing in a circuit. The voltage of a circuit is sensed. A determination is made as to whether execution of at least one execution unit will cause the circuit voltage to drop below a threshold level. In response to a determination that the execution of at least one execution unit will cause the circuit voltage to drop below the threshold level, then at least one execution unit is throttled.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

FIGS. 1 and 3-7 are all predicated on four basic assumptions: i) the instruction execution pipeline is 5 cycles long, i.e. once an execution is started it stays in the pipe and dissipates power for 5 cycles; (ii) at time 0 the instruction scheduler has a change from no activity to a demand to initiate commands for 90% of the cycles; (iii) the operating frequency is 4 GHz; and (iv) the power delivery network has the responses indicated in the examples presented. Each of the examples' figures may then alter one of the basic assumptions to present new results for comparison. Additionally, it is assumed that for every processor cycle that if an execution is initiated then the current associated with the execution of that cycle is roughly equivalent to a pulse of some magnitude for some number of cycles in length, known as the pipeline length.

It is also assumed that one and only one new execution can be initiated every cycle, but this can be stalled on a cycle by cycle basis. Under normal circumstances multiple new executions could be initiated every cycle in a microprocessor, but the concept of the basic assumption still applies and the simulation provides for testing for the 'worst case' scenario. Also, assume the voltage may be measured and processed in one cycle in order to indicate to stall new executions or to allow new executions. Furthermore, assume the cycle time is 250 pico seconds, and that it is desirous to keep the voltage above the minimum required voltage. Furthermore, assume that if no throttling occurs; the voltage will dip to vmin_traditional, the traditional minimum voltage allowed.

In an exemplary embodiment of the present invention, a signal is AND'd to the handshake signal which is sourced from an execution unit in a computer chip and received at the instruction dispatch unit. This handshake signal indicates that the execution unit is available to accept a subsequent instruction. The signal AND'd to the handshake signal is generated in a sensing unit that senses the circuit voltage, then algorithmically determines if further executions will cause the voltage to dip to unacceptably low levels, which is known as the throttling threshold. If further executions will cause the voltage to dip to unacceptably low levels, the sensing unit signals to the instruction dispatch unit that the execution unit is not in a state to accept subsequent instructions, thus stalling, or throttling back, instruction execution. If the sensing unit is in the state indicating that no further instructions can be accepted by the execution unit, the sensing unit continues to monitor the voltage and possibly the voltage's derivative and changes the indication to indicate instruction dispatches to the execution unit may commence under other conditions algorithmically determined.

Figure 2:
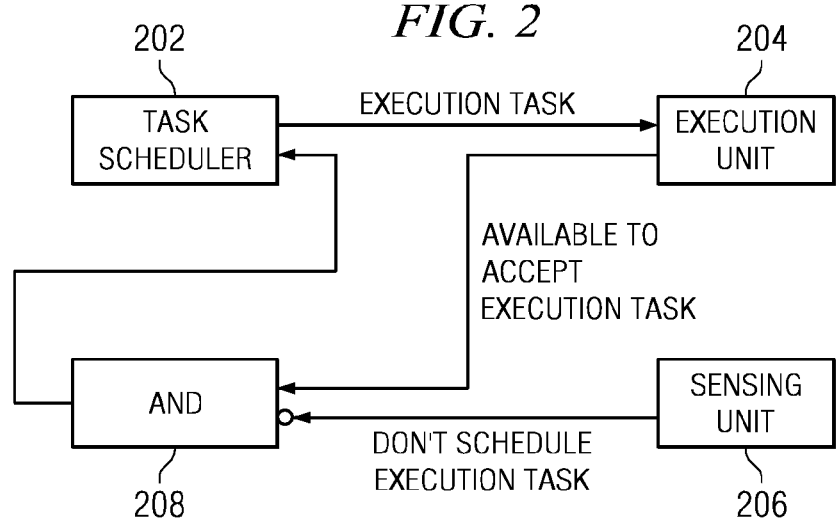
FIG. 2 is a block diagram illustrating the components of a system for mitigating power supply noise response by throttling execution units based upon voltage sensing, in accordance with an exemplary embodiment of the present invention.

FIG. 2 is a block diagram illustrating the components of a system for mitigating power supply noise response by throttling execution units based upon voltage sensing, in accordance with an exemplary embodiment of the present invention. The system is comprised of task scheduler 202, execution unit 204, sensing unit 206, and AND 208. Once execution unit 204 indicates to task scheduler 202 through AND 208 that it is available to accept an execution task, task scheduler 202 sends an execution task to execution unit 204. After execution unit 204 begins the execution task, execution unit 204 sends a message to AND 208 that execution unit 204 is available to accept another execution task. AND 208 also receives a signal from sensing unit 206 through an inverter. Sensing unit 206 senses the circuit voltage and algorithmically determines if further executions will cause the voltage to dip to unacceptably low levels. If sensing unit 206 determines that further executions will cause the voltage to dip to unacceptably low levels, sensing unit 206 sends a signal to AND 208 stating not to schedule an execution task during any given instruction cycle. AND 208 subsequently indicates to task scheduler 202 that it should not initiate a task to execution unit 204. As the signal is sent to AND 208 through an inverter, it will register as false, while the message from execution unit 204 will register as true.

Therefore, AND 208 sends a do not schedule execution task message to task scheduler 202. However, if sensing unit 206 determines that further executions will not cause the voltage to dip to unacceptably low levels, sensing unit 206 does not send a signal to AND 208. This causes the inverter to show as true and therefore AND 208 sends a message to task scheduler 202 that execution unit 204 is available to accept another execution task.

An exemplary embodiment of the present invention can modify the excitation of the processor complex, including the elements discussed earlier as well as other circuits which share the same part of a chip, a chip, a module, a printed circuit card, and/or a system, depending upon the duration and frequency of the excitation. A processor complex is the processor along with its memory infrastructure, such as a cache, and may include other structures, including other chips, powered from the same power supply. The modification is such that voltage dips, also known as noise, caused by the interaction of the currents induced by the chip circuits with the power delivery network, including regulators, transmission paths, and decoupling, may be significantly reduced. Reduced voltage dips, or noise, in a system allows the system designer the flexibility to reduce power by lowering the DC voltage to the circuits, since most of today's logic circuits clock speeds are determined by the circuit's capability to meet cycle times at the lowest instantaneous voltage the circuit ever sees.

However, if lowering system power is not as desirable as increasing clock frequency, an exemplary embodiment of the present invention maintains the voltage to the circuits to levels consistent with traditional decoupling methods. Thus, the clock frequency may be increased by the amount the minimum instantaneous voltage is higher when exemplary aspects of the present invention are implemented as compared to when using traditional decoupling methods.

Figure 3:
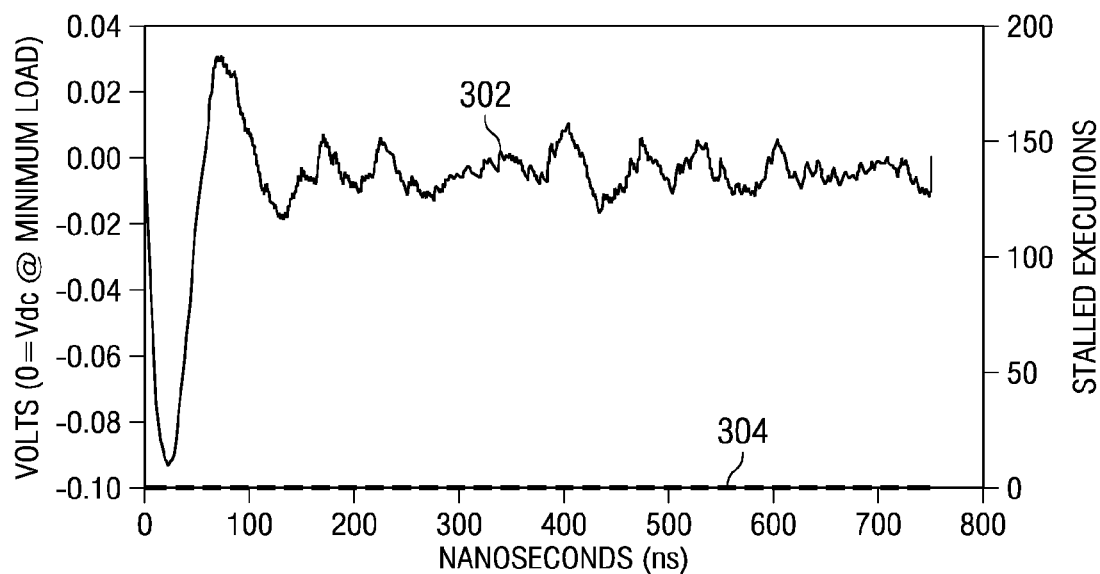
FIG. 3 is a chart depicting the plot of a typical voltage response to a change in processor activity from nearly no executions to initializing executions on 90% of subsequent cycles.

FIG. 3 is a chart depicting the plot, designated as 302, of a typical voltage response to a change in processor activity from nearly no executions to initializing executions on 90% of subsequent cycles. The left axis represents the voltage, from −0.1 to 0.04, where 0=Vdc at the minimum load. The right axis represents the number of stalled executions, from 0 to 200. The horizontal axis represents the number of nanoseconds that have passed, ranging from 0 to 800 ns. In this example, executions requested by the task scheduler are not stalled, as shown by plot 304. The voltage droop in this example is 90 mv below the no-load average voltage. By sensing the voltage and depending upon some function of the voltage stalling the execution of subsequent instructions until the voltage recovers, implementation of exemplary aspects of the present invention may reduce the voltage droop actually experienced, significantly.

Figure 4:
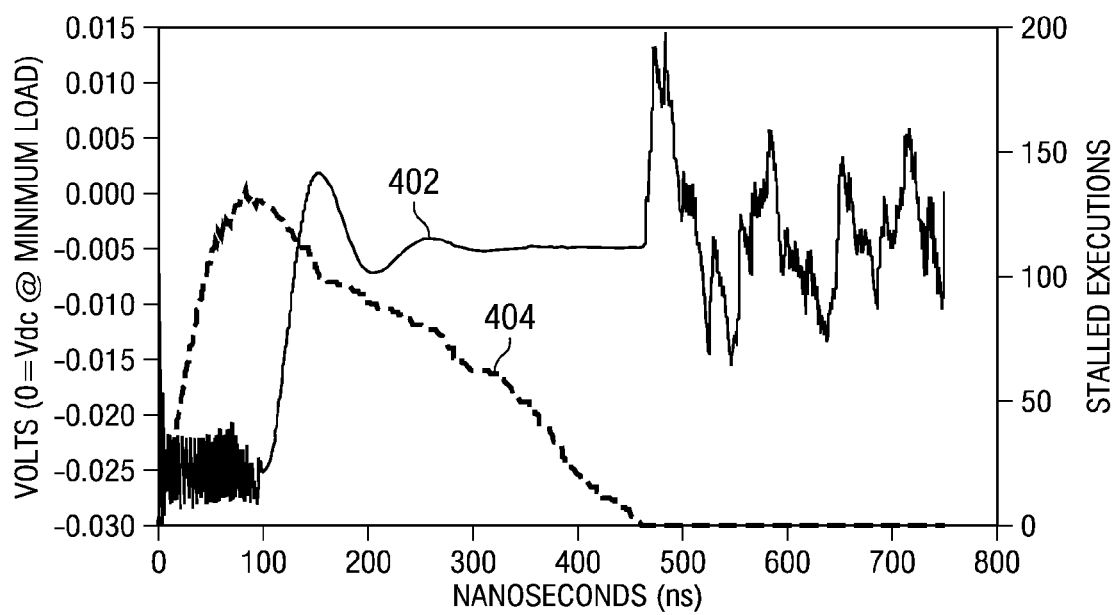
FIG. 4 is a chart depicting the plot of a typical voltage response to a change in demand in processor activity from nearly no executions to initializing executions on 90% of subsequent cycles, in accordance with an exemplary embodiment of the present invention.

FIG. 4 is a chart depicting the plot, designated as 402, of a typical voltage response to a change in demand in processor activity from nearly no executions to initializing executions on 90% of subsequent cycles, in accordance with an exemplary embodiment of the present invention. The left axis represents the voltage, from −0.03 to 0.015, where 0=Vdc at the minimum load. The right axis represents the number of stalled executions, from 0 to 200. The horizontal axis represents the number of nanoseconds that have passed, ranging from 0 to 800 ns. The number of stalls increases from zero in FIG. 3 to about 140 instructions, as shown by plot 404, while the voltage is clipped to roughly 30 mv, as shown by plot 402. However, all instructions will complete execution within 450 ns after the step change, assuming 1800 cycles of a four gigahertz (4 GHz) processor frequency.

In this example, the 60 mv improvement in voltage droop, which an exemplary embodiment of the present invention accomplishes, is roughly 5% of the 1.10 volt Vdd assumed in the example. Vdd stands for the voltage supplied to the circuit. A typical sensitivity for logic circuit timing to Vdd changes might be 1% frequency impact per 1% voltage droop. Therefore, various exemplary embodiments of the present invention make use of the reduced droop to either (i) increase operating frequency; (ii) enhance chip yields; (iii) lower voltage and hence reduce chip power; and (iv) reduce decoupling; or (v) any combination of these.

An exemplary embodiment of the present invention enables chip operating frequencies to be enhanced for like processors in like systems because the minimum instantaneous voltage is 5% higher than currently available. The 5% higher minimum instantaneous voltage supplying the circuits allows roughly 5% higher frequency to be used as compared to the case where exemplary aspects of the present the invention are not utilized, provided that the DC voltage remains constant. The rise in AC power dissipation caused by the higher operating frequency may be offset by reducing the DC voltage and running the frequency at roughly 3.5% higher and the voltage 1.5% lower, if staying within the same power envelope is desired.

In another exemplary embodiment of the present invention, instead of increasing system operating frequency, the improvement in minimum instantaneous voltage is allocated to the improvement of chip yields. The 5% increase in minimum instantaneous voltage will allow chips that are 5% slower to work without error. For today's process spreads, this represents about a half a standard deviation of improved performance limited yield. Depending upon the relative position of the sort bucket to the distribution center, one could expect to experience as much as a 28% improvement in serviceability, for sort buckets centered near the distribution center.

In another exemplary embodiment of the present invention, the improvement in minimum instantaneous voltage is used to reduce the chip's power while maintaining the original operating frequency and chip yields. The 60 mv improvement in droop noise discussed in FIG. 4 may be allocated to a reduction in DC voltage to the chip. This embodiment of the invention ensures that the same chip that functions at a given voltage when not employing the 60 mv reduction will still work at the same frequency with the DC voltage reduced 60 mv. As a result, in the example in FIG. 4, the power dissipated by the chip would be reduced by 10% with a 60 mv reduction in the DC voltage.

Another exemplary embodiment of the present invention modifies the current excitation of the processor to the power delivery network by stalling instruction execution initiations when required. The first droop noise magnitude is made somewhat independent of the value and amount of decoupling capacitance that is placed on the power delivery network. This is especially true for the expensive higher frequency responding decoupling that is placed on chips and on modules. In this case "chips" means the silicon die and a "module" refers to a chip soldered onto a carrier.

Figure 1:
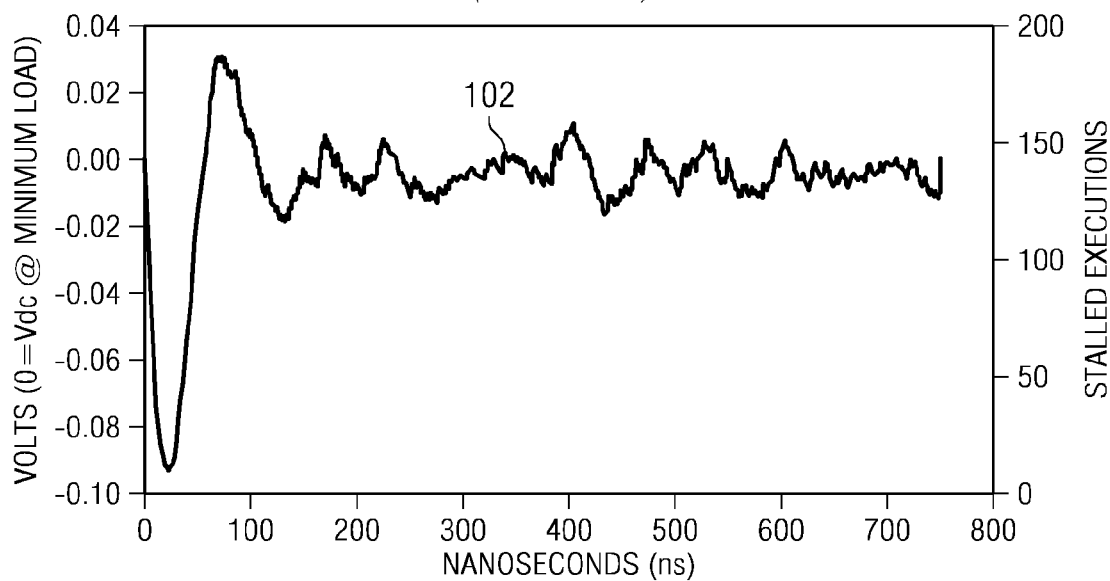
FIG. 1 is a chart depicting an example plot of the voltage droop that can occur with a transition of execution demand of nearly 0% capacity to 90% capacity.
Figure 5A:
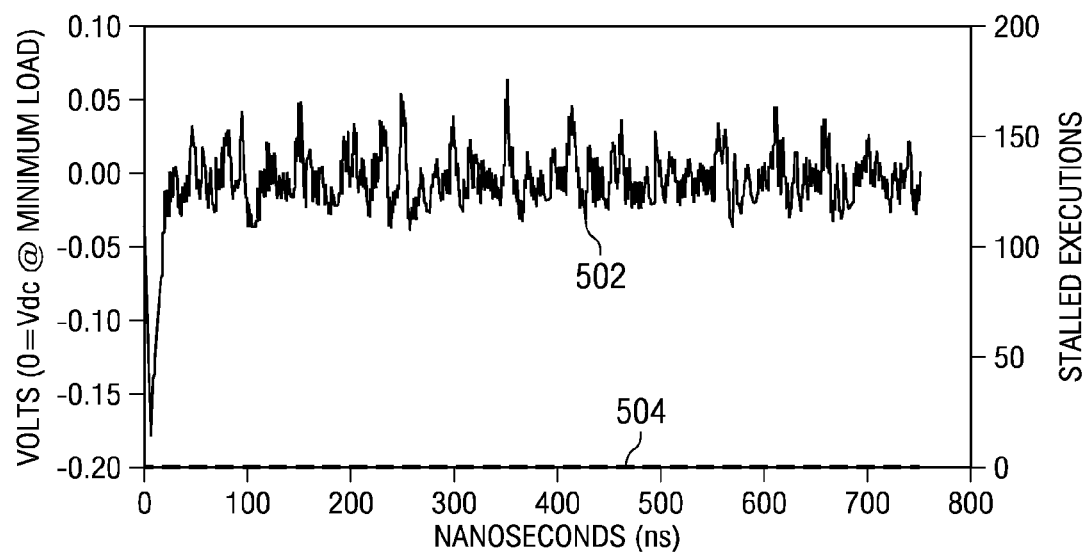
FIG. 5A depicts the plot of a typical voltage response to a change in demand in processor activity from nearly no executions to initializing executions on 90% of subsequent cycles under the condition that the voltage noise is presented where the high frequency capacitor decoupling is reduced to 50 nF.

FIG. 5A depicts the plot, designated as 502, of a typical voltage response to a change in demand in processor activity from nearly no executions to initializing executions on 90% of subsequent cycles under the condition that the voltage noise is presented where the high frequency capacitor decoupling is reduced to 50 nF (nanofarads), as compared to the 500 nF used in the examples in FIGS. 1, 3 and 4. The left axis represents the voltage, from −0.2 to 0.1, where 0=Vdc at the minimum load. The right axis represents the number of stalled executions, from 0 to 200. The horizontal axis represents the number of nanoseconds that have passed, ranging from 0 to 800 ns. As seen on the chart in FIG. 5A, without stalling executions, as indicated by plot 504, the voltage noise droop with 50 nF of capacitance is around 175 mv. This compares to the above examples in FIGS. 1, 3 and 4 with 500 nF of capacitance that showed a droop of around 90 mv.

Figure 5B:
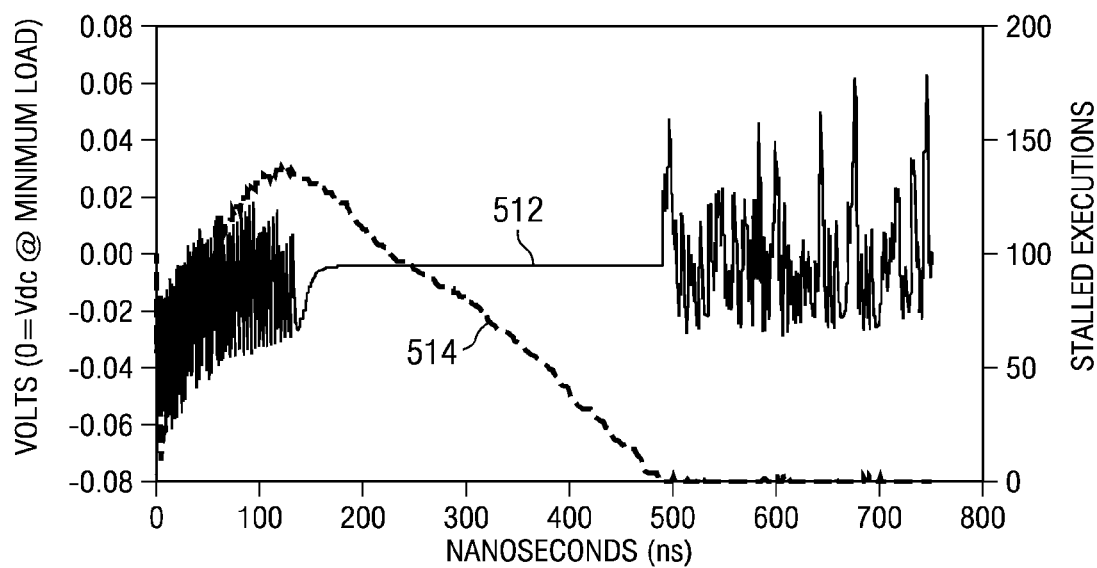
FIG. 5B depicts the plot of a typical voltage response to a change in demand in processor activity from nearly no executions to initializing executions on 90% of subsequent cycles under the condition that the voltage noise is presented where the high frequency capacitor is reduced to 50 nF, in accordance with an exemplary embodiment of the present invention.

FIG. 5B depicts the plot, designated as 512, of a typical voltage response to a change in demand in processor activity from nearly no executions to initializing executions on 90% of subsequent cycles under the condition that the voltage noise is presented where the high frequency capacitor is reduced to 50 nF, in accordance with an exemplary embodiment of the present invention. The left axis represents the voltage, from −0.08 to 0.08, where 0=Vdc at the minimum load. The right axis represents the number of stalled executions, from 0 to 200. The horizontal axis represents the number of nanoseconds that have passed, ranging from 0 to 800 ns. The chart in FIG. 5B shows that in the same situation as in FIG. 5A, the 50 nF capacitance experiences only about a 70 mv droop at the cost of an increase of stalled instructions as shown by plot 514. However, as shown, the number of instructions that are stalled at any one time for later execution is fewer than 150.

The level of measurable performance degradation will vary depending upon the benchmark processing characteristics. However, long lived benchmark processes will see insignificant performance degradation when utilizing exemplary aspects of the present invention. In all the examples in FIGS. 1, 3, 4, 5A & B, the maximum added latency for initiating instructions is about 35 nsec and all executions have caught up to demand in less than 500 nsec, after a worst case condition where the processor was idle. For benchmarks that last at least a millisecond, this should have no more than 0.05% impact on the benchmark performance. For benchmarks or jobs that last longer than a millisecond, or that see less than a 0% to 90% activity change in execution demand change, even less impact will be seen.

Figure 6:
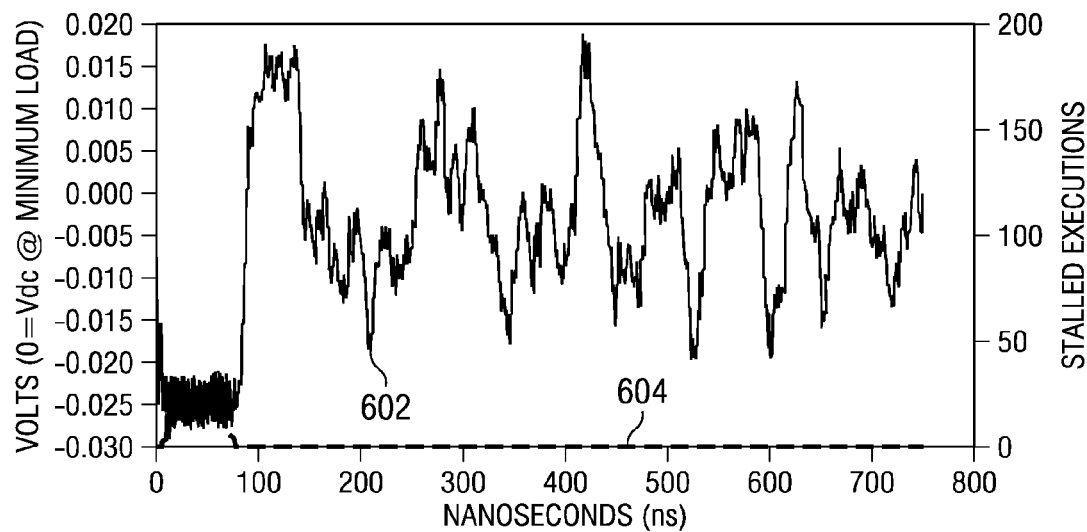
FIG. 6 is a chart depicting the plot of a typical voltage response to a change in demand in processor activity from nearly no executions to initializing executions on 50% of subsequent cycles, in accordance with an exemplary embodiment of the present invention.

FIG. 6 is a chart depicting the plot, designated as 602, of a typical voltage response to a change in demand in processor activity from nearly no executions to initializing executions on 50% of subsequent cycles, in accordance with an exemplary embodiment of the present invention. The left axis represents the voltage, from −0.03 to 0.02, where 0=Vdc at the minimum load. The right axis represents the number of stalled executions, from 0 to 200. The horizontal axis represents the number of nanoseconds that have passed, ranging from 0 to 800 ns. Under these conditions, the number of stalled task initiations drops to less than 30, as shown by plot 604, with an impact of less than 8 nsec latency for any given instruction and 80 nsec until all execution dispatches have caught up with demand.

Figure 7A:
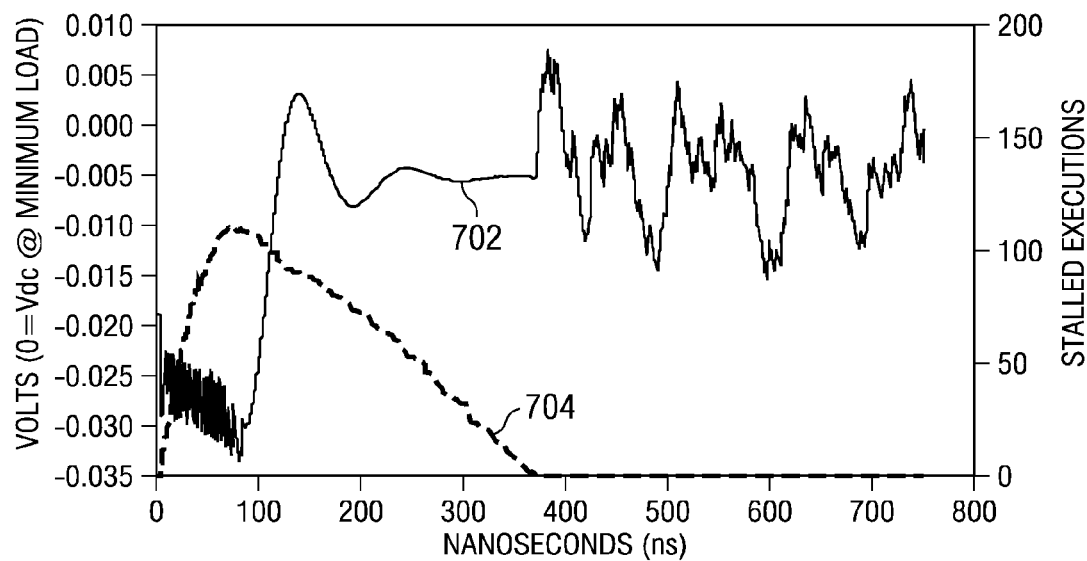
FIG. 7A is a chart depicting the plot of a typical voltage response to a change in demand in processor activity from nearly no executions to initializing executions on 90% of subsequent cycles where the number of voltage averaging cycles is 750 cycles, in accordance with an exemplary embodiment of the present invention.
Figure 7B:
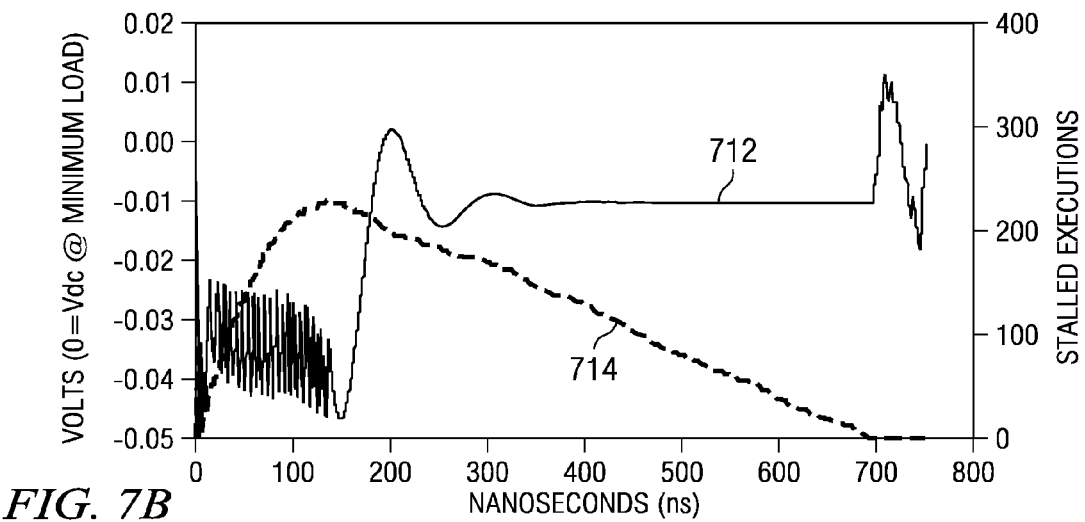
FIG. 7B is a chart depicting the plot of a typical voltage response to a change in demand in processor activity from nearly no executions to initializing executions on 90% of subsequent cycles where the number of voltage averaging cycles is 750 cycles and the pipeline is 10 cycles, in accordance with an exemplary embodiment of the present invention.

A user has the freedom to implement the throttling threshold in a variety of ways. In an exemplary embodiment of the present invention, the throttling threshold is implemented as a function of the average voltage of the voltage domain delivered to the circuits. In the examples in FIGS. 1 and 3-6, the averaging of the voltage delivered to the circuit was done across 1500 cycles. The number of cycles, or time period, of the averaging may be tuned to the power distribution and chip performance such that stalled cycles are minimized and the minimum voltage droop is somewhat spread evenly throughout the period the executions are being stalled. FIGS. 7A and 7B show an example where the number of averaging cycles was reduced to 750 cycles.

FIG. 7A is a chart depicting the plot, designated as 702, of a typical voltage response to a change in demand in processor activity from nearly no executions to initializing executions on 90% of subsequent cycles where the number of voltage averaging cycles is 750 cycles, in accordance with an exemplary embodiment of the present invention. The left axis represents the voltage, from −0.035 to 0.01, where 0=Vdc at the minimum load. The right axis represents the number of stalled executions, from 0 to 200. The horizontal axis represents the number of nanoseconds that have passed, ranging from 0 to 800 ns. The lower number of cycles used for averaging results in the minimum instantaneous droop being lower after the initial step, when compared to the prior examples. The initial step is when plot 702 first changes from a negative transition to a positive one near time 0. The lowest minimum instantaneous droop, as shown on plot 702, is at an approximate value of −35 mv, which is lower than the −30 mv that plot 702 initially dropped to upon the initiation of a demand to initiate commands for 90% of the cycles. In prior examples, such as FIG. 6, the minimum voltage is pretty steady, or higher, during the time during the period the stalling is occurring. That is, looking at FIG. 6, the minimum value of plot 602 is roughly the same throughout the period before plot 604 begins to decline. Also, looking at FIG. 5B, the minimum value of plot 512 is at the initial step. This sort of result, illustrated by plot 702, where there is a continued lowering of the minimum voltage, is undesirable for the assumptions set forth for these examples.

FIG. 7B is a chart depicting the plot, designated as 712, of a typical voltage response to a change in demand in processor activity from nearly no executions to initializing executions on 90% of subsequent cycles where the number of voltage averaging cycles is 750 cycles and the pipeline is 10 cycles, in accordance with an exemplary embodiment of the present invention. The left axis represents the voltage, from −0.05 to 0.02, where 0=Vdc at the minimum load. The right axis represents the number of stalled executions, from 0 to 200. The horizontal axis represents the number of nanoseconds that have passed, ranging from 0 to 800 ns. FIG. 7B illustrates that in cases where the instruction pipeline is long, it might be desirable to use fewer cycles to determine the average voltage, in order to achieve optimal benefits from the implementation of exemplary embodiments of the present invention. FIG. 7B shows that the initial droop of plot 712 is roughly the same as the droop of plot 712 that occurs near the end of the period where the stalled instructions, as indicated by plot 714, are still increasing.

Figure 8:
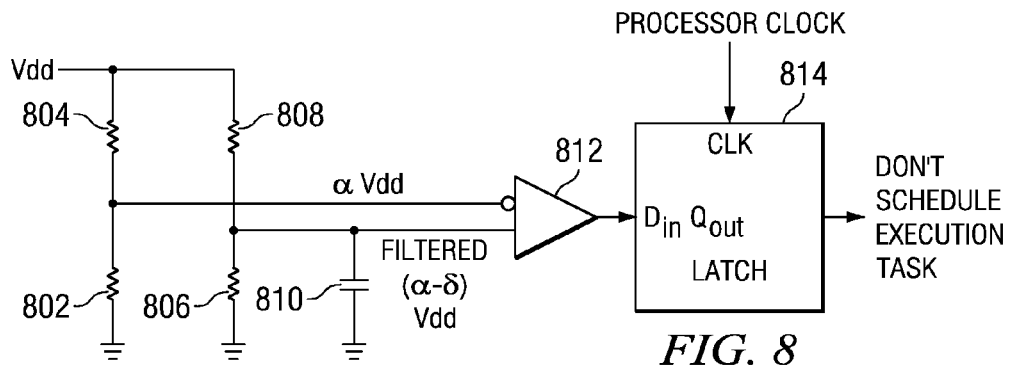
FIG. 8 is a circuit diagram for a sensing mechanism, in accordance with an exemplary embodiment of the present invention.

FIG. 8 is a circuit diagram for a sensing mechanism, in accordance with an exemplary embodiment of the present invention. The circuit comprises resistors 802, 804, 806, and 808, capacitor 810, comparator 812, and latch 814. A comparator is a device which compares two voltages or currents, and switches its output to indicate which is larger. Resistors 802 and 804 comprise a resistor divider network that presents a first fraction of the Vdd voltage to the inverting input of the comparator 812. This first fraction is represented by the term $\alpha$. $\alpha$ is representative of a value between 0 and 1. $\alpha$ is chosen to assure that the voltage presented to the inverting input of comparator 812 is within the operational range of comparator 812. Resistors 806 and 808 comprise a second resistor divider network that presents a second fraction for the Vdd voltage to the non-inverting input of the comparator 812. This voltage is filtered by capacitor 810 so that the voltage at the non-inverting input of the comparator 812 is averaged over the time period determined by the values of resistors 806 and 808 and capacitor 810. The second fraction is slightly less than the first fraction. The second fraction is represented by the term $(\alpha-\delta)$. $\delta$ is representative of a value between 0 and that represented by first fraction $\alpha$. $\delta$ divided by $\alpha$ represents the fraction of the average voltage on Vdd, that should the noise droop below that average voltage on Vdd, then initiation of instruction executions will be stalled. Latch 814 is comprised of Din, where the comparator inputs to the latch; Qout, which sends the output signal to prevent scheduling of an execution task; and a processor clock input. The unfiltered Vdd containing noise, $\alpha$Vdd, is compared to the filtered Vdd, $(\alpha-\delta)$Vdd, by comparator 812. If $\alpha$Vdd is lower than $(\alpha-\delta)$Vdd, then comparator 812 sends a signal to latch 814, and latch 814 sends the message to disallow the scheduling of a subsequent execution task.

Those skilled in the art may recognize that these functions described above may be accomplished via other means such as sampling and holds, comparator chains, etc. The description above has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

Another exemplary embodiment of the present invention provides for sensing the Vdd voltage with sample and hold circuitry such that the samples were taken at the same point in the processor clock cycle period so that the high frequency ripple may be filtered out at frequency.

This circuit may be replicated around each of the execution units in a microprocessor and may operate either in sync, or independently from similar circuits placed throughout the microprocessor. The execution stall can be done on a per unit basis if need be, and indeed may be an exemplary embodiment since the spatial separation of units may result in some electrical isolation as well.

Exemplary embodiments of the present invention are presented based upon the assumption that noise that increases voltage is not a problem. If that is not the case, then an exemplary implementation of the present invention provides for the scheduling of 'dummy' executions in units based upon a voltage threshold higher than the nominal threshold. This assumes that the power distribution network looks like a 2 pole resonant impedance during the ringing that results in the voltage dips that limit performance; i.e. 1st or 2nd peak to step response. However, the scope of this invention should not be limited to 2 pole resonant power distribution structures, but can be extended to cases where the power distribution network represents either simpler or more complex frequency response characteristics.

Another exemplary embodiment of the present invention is applicable to chips that utilize clock gating of execution units for the purpose of minimizing power dissipation when those units are not active. When the task scheduler indicates that clocks on any particular execution unit should resume, then the sensing unit could use the output of the voltage comparison circuits if a voltage droop occurs, possibly due to other execution units resuming clocking, to delay initiation of the clocks to that execution unit. This would accomplish the same kind of clipping of voltage droop that delay of task dispatches do in the previous examples.

Figure 9:
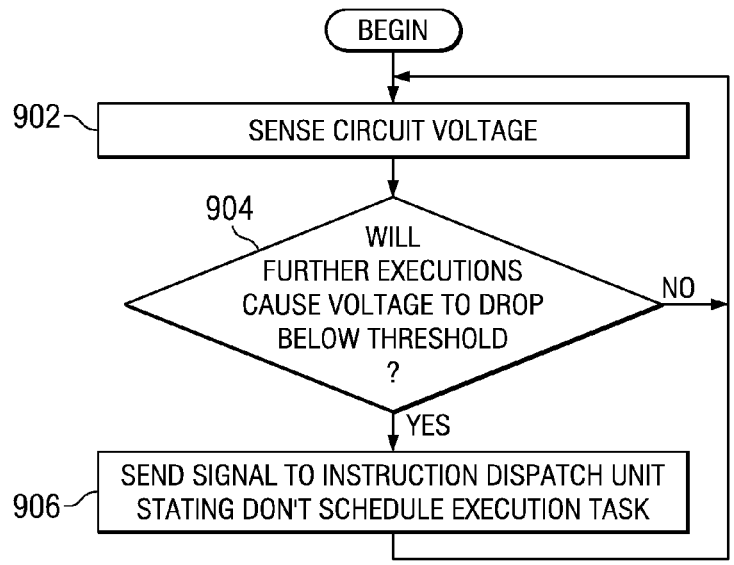
FIG. 9 is a flowchart illustrating the operation of throttling execution units based upon voltage sensing, in accordance with an exemplary embodiment of the present invention.

FIG. 9 is a flowchart illustrating the operation of throttling execution units based upon voltage sensing, in accordance with an exemplary embodiment of the present invention. The operation begins by a sensing unit sensing the circuit voltage (step 902). Then the sensing unit algorithmically determines if further executions will cause the voltage to drop below a threshold level (step 904). If the sensing unit determines that further executions will not cause the voltage to drop below a threshold (a no output to step 904), the operation returns to step 902 and the sensing unit continues to monitor the circuit voltage. If the sensing unit determines that further executions will cause the voltage to drop below the threshold (a yes output to step 904), the sensing unit sends a signal to the instruction dispatch unit telling the instruction dispatch unit to not schedule execution tasks for the execution unit (step 906). The sensing unit then returns to step 902 and continues to sense the circuit voltage.

The circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A system for mitigating power supply and power distribution system noise response by throttling execution units based upon voltage sensing in a circuit, the system comprising:
   a task scheduling unit for scheduling instructions for execution;
   an execution unit for executing instructions;
   a sensing unit that senses an actual circuit voltage and outputs a sensing signal, and wherein the sensing unit includes a determining unit and a throttling unit;
   a logical unit receiving the sensing signal and a signal from the execution unit and the sensing unit, wherein the logical unit is an AND circuit;
   wherein the determining unit is a comparator that compares an actual circuit voltage to a threshold voltage to determine if execution of at least one execution unit will cause the actual circuit voltage to drop below the threshold level, and wherein the comparator outputs a compared signal; and
   wherein the throttling unit is a latch that receives the compared signal and, in response to a determination that the execution of the at least one execution unit will cause the actual circuit voltage to drop below the threshold level, throttles scheduling of the at least one execution unit, and wherein the throttling unit outputs the sensing signal.

2. The system of claim 1, wherein the logical unit receives the sensing signal and, responsive to a value of the sensing signal, sends a throttling signal to stall the scheduling of the at least one execution unit.

3. The system of claim 2, wherein the throttling signal comprises:
   two separate signals ANDed together.

4. The system of claim 3, wherein the two separate signals comprise a handshake signal from the execution unit and the sensing signal from the sensing unit.

5. The system of claim 1, further comprising:
   a mechanism for increasing operating frequency corresponding to a reduced droop.

6. The system of claim 1, further comprising:
   a mechanism for enhancing chip yields corresponding to a reduced droop.

7. The system of claim 1, further comprising:
   a mechanism for reducing decoupling capacitance corresponding to a reduced droop.

8. The system of claim 1, further comprising:
   a mechanism for reducing chip power requirements corresponding to a reduced droop.

9. The system of claim 1, further comprising:
   a mechanism for filtering out high frequency ripple.

10. The system of claim 9, wherein sensing the actual circuit voltage occurs at a same point in a processor clock cycle period.

11. The system of claim 1, further comprising:
    a scheduling unit for scheduling dummy executions at a higher threshold level than the threshold level.

12. The system of claim 1, wherein sensing the actual circuit voltage occurs when a processor clock indicate that execution should resume.

13. The system of claim 1, further comprising:
    a plurality of sensing units.

14. The system of claim 13, further comprising:
    a plurality of execution units, wherein each sensing unit in the plurality of sensing units is located in close proximity to the execution unit out of the plurality of execution units for which the sensing unit would throttle instruction execution.

15. The system of claim 13, wherein the plurality of sensing units act in concert.

16. The system of claim 13, wherein the plurality of sensing units act independently.

17. The system of claim 13, wherein the plurality of sensing units sense voltages of remote locations.

18. The system of claim 1, further comprising:
    a plurality of task scheduling units.

19. The system of claim 1 further comprising:
    a delaying unit, in response to a determination that the execution of the at least one execution unit will cause the actual circuit voltage to drop below the threshold level, for delaying initiation of clocks to the at least one execution unit.

20. The system of claim 1, wherein the sensing unit includes:
    a first resistor divider that is directly connected to the actual circuit voltage and an inverting input of the comparator, wherein the first resistor divider presents a first fraction of the actual circuit voltage to the inverting input of the comparator, and wherein the actual circuit voltage is an unfiltered voltage that contains noise; and
    a second resistor divider that is directly connected to the actual circuit voltage, a capacitor, and a non-inverting input of the comparator, wherein the capacitor filters the actual circuit voltage to produce a filtered voltage that is presented to the non-inverting input of the comparator.

* * * * *